US009156007B2

(12) United States Patent
Correia et al.

(10) Patent No.: US 9,156,007 B2
(45) Date of Patent: Oct. 13, 2015

(54) SEEDING METHOD FOR DEPOSIT OF THIN SELECTIVE MEMBRANE LAYERS

(75) Inventors: Lucretia Agnes Correia, Petten (NL); Johannis Pieter Overbeek, Petten (NL); Yvonne Christine Van Delft, Petten (NL)

(73) Assignee: STICHTING ENERGIEONDERZOEK CENTRUM NEDERLAND, Petten (NL)

( * ) Notice: Subject to any disclaimer, the term of this patent is extended or adjusted under 35 U.S.C. 154(b) by 116 days.

(21) Appl. No.: 13/819,586

(22) PCT Filed: Aug. 26, 2011

(86) PCT No.: PCT/NL2011/050578

§ 371 (c)(1),
(2), (4) Date: Feb. 27, 2013

(87) PCT Pub. No.: WO2012/030212

PCT Pub. Date: Mar. 8, 2012

(65) Prior Publication Data

US 2013/0152786 A1 Jun. 20, 2013

(30) Foreign Application Priority Data

Aug. 30, 2010 (NL) ..................................... 2005290
Mar. 18, 2011 (NL) ..................................... 2006423

(51) Int. Cl.

| | |
|---|---|
| ***B01D 71/02*** | (2006.01) |
| ***B01D 53/22*** | (2006.01) |
| ***B01D 67/00*** | (2006.01) |
| ***B01D 63/06*** | (2006.01) |
| ***B01D 69/04*** | (2006.01) |
| ***B01D 69/10*** | (2006.01) |
| ***C01B 3/50*** | (2006.01) |
| ***C01B 13/02*** | (2006.01) |
| ***C23C 18/16*** | (2006.01) |
| ***C23C 18/18*** | (2006.01) |
| ***C23C 18/32*** | (2006.01) |
| ***C23C 18/38*** | (2006.01) |
| ***C23C 18/44*** | (2006.01) |

(52) U.S. Cl.

CPC ............ *B01D 71/022* (2013.01); *B01D 53/228* (2013.01); *B01D 63/066* (2013.01); *B01D 67/0069* (2013.01); *B01D 69/04* (2013.01); *B01D 69/105* (2013.01); *C01B 3/505* (2013.01); *C01B 13/0255* (2013.01); *C23C 18/1644* (2013.01); *C23C 18/1879* (2013.01); *C23C 18/32* (2013.01); *C23C 18/38* (2013.01); *C23C 18/44* (2013.01); *B01D 2256/16* (2013.01); *B01D 2257/404* (2013.01); *B01D 2257/406* (2013.01); *B01D 2257/502* (2013.01); *B01D 2257/504* (2013.01); *B01D 2257/7022* (2013.01); *B01D 2257/80* (2013.01); *B01D 2323/08* (2013.01); *B01D 2325/04* (2013.01); *B01D 2325/30* (2013.01); *B01D 2325/48* (2013.01); *C01B 2203/0405* (2013.01); *C01B 2203/047* (2013.01); *C01B 2203/048* (2013.01); *C01B 2203/0465* (2013.01); *C01B 2203/0475* (2013.01); *C01B 2203/0495* (2013.01); *C01B 2210/0046* (2013.01); *Y02C 10/10* (2013.01)

(58) Field of Classification Search

CPC .. B01D 53/228; B01D 67/0069; B01D 69/04; B01D 69/105; B01D 71/022; B01D 63/006; B01D 2256/12; B01D 2256/16; C01B 13/0255; C01B 3/505; C23C 18/0255; C23C 18/1644; C23C 18/1879; C23C 18/32; C23C 18/38; C23C 18/44

USPC .................. 95/45, 54, 55, 56; 96/4, 8, 10, 11; 427/304, 305

See application file for complete search history.

(56) References Cited

U.S. PATENT DOCUMENTS

| | | | | |
|---|---|---|---|---|
| 5,614,001 A * | 3/1997 | Kosaka et al. | .................... | 96/10 |
| 6,152,987 A * | 11/2000 | Ma et al. | ........................... | 95/56 |
| 6,379,524 B1 * | 4/2002 | Lee et al. | ...................... | 205/255 |
| 2008/0038567 A1 * | 2/2008 | Way et al. | .................. | 427/383.1 |
| 2008/0176060 A1 | 7/2008 | Harold et al. | | |

(Continued)

FOREIGN PATENT DOCUMENTS

| | | | | |
|---|---|---|---|---|
| CN | 1164436 | 11/1997 | | |
| CN | 101054663 A | * 10/2007 | ............. | C23C 18/30 |
| KR | 2001-018853 | 3/2001 | | |

(Continued)

OTHER PUBLICATIONS

Paglieri, Stephen N. et al., "A New Preparation Technique for Pd/Alumina Membranes with Enhanced High-Temperature Stability", Ind. Eng. Chem. Res., 1999, vol. 38, pp. 1925-1936.*

(Continued)

*Primary Examiner* — Jason M Greene

(74) *Attorney, Agent, or Firm* — Gilberto M. Villacorta; Sunit Talapatra; Foley & Lardner LLP

(57) ABSTRACT

A process of producing transition metal-based membranes or other layers on a porous support is provided. The layers are suitable for hydrogen separation, oxygen separation, or protective or decorative purpose sand are produced by pretreating the porous support by coating with a solution of a transition metal salt, drying the seeded support, reducing the transition metal salt to transition metal metal, and electroless plating with a complex of a transition metal (palladium, silver or other) and optionally other metals. The membranes can be tubular with a transition metal layer of 1-10 μm on its outside.

14 Claims, No Drawings

(56) References Cited

U.S. PATENT DOCUMENTS

| | | | |
|---|---|---|---|
| 2008/0282882 | A1 | 11/2008 | Saukaitis et al. |
| 2009/0130477 | A1 | 5/2009 | Hou et al. |

FOREIGN PATENT DOCUMENTS

| | | |
|---|---|---|
| KR | 2001-045207 | 6/2001 |
| WO | WO-2005/065806 | 7/2005 |

OTHER PUBLICATIONS

Bortolotto, R. et al., "Direct hydroxylation of benzene to phenol in a novel microstructured membrane reactor with distributed dosing of hydrogen and oxygen", Separation and Purification Technology, May 2010, vol. 73, pp. 51-58.*

Bortolotto, L. et al: "Direct hydroxylation of benzene to phenol in a novel microstructured membrane reactor with distributed dosing of hydrogen and oxygen", Separation and Purification Technology, Elsevier Science, Amsterdam, NL, vol. 73, No. 1, May 28, 2010, pp. 51-58, XP027054596.

International Search Report for PCT/NL2011/050578—mailed Nov. 15, 2011.

Kikuchi, E. et al: "Preparation of supported thin palladium-silver alloy membranes and their characteristics for hydrogen separation*" Gas Separation & Purification, vol. 5, No. 4, Dec. 1, 1991, pp. 261-266, XP55011000.

Li, Anwu et al. "Fabrication of dense palladium composite membranes for hydrogen separation", Catalysis Today, vol. 56, 2000, pp. 45-51, XP002623587.

Paglieri, Stephen N. et al: "A New Preparation Technique for Pd/Alumina Membranes with Enhanced High-Temperature Stability", Industrial & Engineering Chemistry Research, vol. 38, 1999, pp. 1925-1936, XP002623586.

Collins, et al. "Preparation and characterization of a composite palladium-ceramic membrane", Ind. Eng. Chem. Res. (1993), vol. 32, No. 12, pp. 3006-3013.

Zhao, et al. "Preparation and characterization of palladium-based composite membranes by electroless plating and magnetron sputtering", Catalysis Today (Feb. 25, 2000), vol. 56, Issues 1-3, pp. 89-96.

* cited by examiner

SEEDING METHOD FOR DEPOSIT OF THIN SELECTIVE MEMBRANE LAYERS

CROSS-REFERENCE TO RELATED APPLICATIONS

This application is the National Phase of International Patent Application No. PCT/NL2011/050578, filed Aug. 26, 2011, published as WO 2012/030212, which claims priority to Netherland Application Nos. 2005290, filed Aug. 30, 2010 and 2006423, filed Mar. 18, 2011. The contents of these applications are herein incorporated by reference in their entirety.

The present invention pertains to a process for the production of transition metal-based layers and membranes for separation of hydrogen, and to the membranes obtained by this process.

BACKGROUND

Asymmetric membranes comprising a porous support and a thin dense palladium layer are useful for the separation of hydrogen from other gases such as carbon dioxide and other small molecules such as hydrocarbons and other hydrides. A cost-effective production of palladium-based membranes with electroless plating of porous supports requires the presence of palladium seeds on the porous support. For growing thin dense Pd membranes substantially free of defects, the seeds should be homogeneously distributed over the support in a sufficient amount.

Asymmetric membranes comprising a porous support and a thin dense silver layer are useful for the separation of oxygen from other small molecules. (see e.g. http://www.anorg.chem.uu.nl/PDF/Bergwerff_silver%20literature.pdf)

Collins and Way (*Ind. Eng. Chem. Res.* 1993, 32, 3006-13) use multiple pre-treatments of the support with tin chloride followed by acidic palladium chloride immersion before repeated electroless plating with palladium-amine complex. Li et al. (*Catalysis Today,* 56, 2000, 45-51) similarly use tin chloride pre-treatment followed by acidic palladium amine before enhanced electroless plating driven by osmosis. Paglieri et al. (*Ind. Eng. Chem. Res.* 1999, 38, 1925-1936) proposed an improved seeding procedure of dipping the inside of the support into a palladium acetate solution, with chloroform as the solvent, followed by drying and calcining. The resulting membrane had a thickness of ~20 μm and the $H_2/N_2$ selectivity was not higher than 50. Zhao et al. (*Catalysis Today,* 56, 2000, 89-96) used activation by slip-casting with a Pd-modified boehmite sol, followed by drying and calcining. The use of a boehmite sol is also described in CN 1164436 and U.S. 2008-176060. A pre-treatment with a silica sol is described in KR 2001-045207 and KR 2001-018853. Hou et al. (WO2005/065806) use a boehmite sol as a pore filler before seeding following the tin chloride procedure. After calcining, γ-alumina is formed in the pores restoring the porous structure of the support. Harold et al. (U.S. 2008/0176060) use two γ-alumina layers to sandwich the palladium seeds (layer) applied by electroless plating acting as nuclei for growing palladium in the pores of the top γ-alumina layer also by electroless plating.

These prior art methods lead to insufficient performance of the membranes thus obtained in terms of hydrogen flux, $H_2/N_2$ selectivity and stability. The tin chloride pre-treatment results in the presence of tin contamination, which affects both the stability of the plating bath and the temperature stability of the palladium membrane. Even when the pre-treatment does not contain a tin salt pre-treatment, like the improved procedure by Paglieri that uses palladium acetate only, the membrane is thick and disappointingly low selectivities of 50 are obtained. The use of chloroform as a solvent during fabrication is a further disadvantage of their procedure. The use of boehmite sols and the like may result in blocking pores and thus reduce separation performance. It may also reduce the maximum application temperature because of limited thermal stability. Also, the prior art methods do not always allow very thin palladium layers to be produced.

It is therefore an object of the invention to provide a process for producing thin membranes based on palladium, which leads to improved performance of the palladium-based separation layer, and which allows the production of separation membranes having very thin (<5 μm) layers of palladium.

DESCRIPTION OF THE INVENTION

The invention pertains to a process of producing transition metal-based layers, which layers may be suitable for gas separation, for decorative or antimicrobial purposes, for corrosion protection, or for other purposes, the process comprising:

- pre-treating a porous support with a solution of a transition metal salt,
- drying the support,
- reducing the transition metal salt to the corresponding transition metal,
- electroless plating with one or more transition metal complexes.

In particular, the layers are part of a membrane on a porous support.

Preferably, the process of the invention does not involve a pre-treatment with a tin salt. Also, it is not preferred to pre-treat the support with other non-transition metal compounds. Furthermore, the utilisation of potentially harmful solvents, such as chloroalkanes for the palladium salt is preferably avoided.

The invention furthermore pertains to a transition metal-based membrane on a porous support, which membrane is suitable for gas separation, said membrane being characterised by a transition metal layer at one side having a thickness of between 1 and 10 μm.

The layer or membrane of the invention is anchored in the porous support with transition metal seeds up to a depth of 5 μm and no less than 0.5 μm. The transition metal membrane has a shiny appearance because of the smoothness of the surface which reduces accumulation of contaminants at the surface.

The porous support preferably has a cylindrical geometry, such as a tube, especially for separation purposes, but it can also be flat, or have any other shape, e.g. for decorative applications. The support may be any ceramic material such as alumina, zirconia, silica, a metal, such as cast iron, stainless steel, an organic polymer, such as polyethylene, polypropylene, and the like. If the support has a cylindrical geometry, the number of channels in the support along the axis can be 1 or higher, preferably 6n+1 (n being an integer, preferably 1-10, more preferably 1-7, most preferably 1 or 3) in a hexagonal, quasi cylindrical arrangement, more preferably 1, 7 (2+3+2), 19 (3+4+5+4+3), or 43 (1+4+7+6+7+6+7+4+1) channels, most preferably 7, 19. The tube can have any length, which may be determined by several factors, such as the heat treatment facilities available and the intended use. Preferred lengths are from 0.4 to 5 meters. Most preferred length is between 0.5 and 2 meters, e.g. about 1 meter. The porosity and pore size of the support is not critical, as long as the pores are sufficiently wide to allow adequate penetration of the treating solutions. Preferably, the pore size is at least 25 nm. More preferably, the support is a macroporous support having pore sizes in the range of 50 nm to 1 μm, most preferably in the range of 100 to 500 nm.

In a preferred embodiment of the process of the invention, the transition metal layer is applied on the outside of the tubular porous support, thus resulting in membranes having an outer transition metal layer allowing to use higher feed pressures in the separation process compared to the situation where the selective layer is placed on the inside of the tube.

In another preferred embodiment, multichannel supports with e.g. 7, 19 or 43 channels are used, as in general they are better resistant against the higher feed pressures. In order to use the higher specific surface area, the transition metal layer is applied on the inside of the individual channels.

In the present description, a transition metal is an element from groups 3-12 (IIIb-IIb) of periods 4-6 of the periodic system of elements (element numbers 21-30, 39-48 and 57-80), especially from groups 4-11 (IVb-Ib). In particular, the transition metals are elements from the platinum group (groups 8-10 or VIIIb) or the gold group (group II or Ib). The pre-treating step is preferably performed using one or more metals from the platinum group (Fe, Co, Ni, Ru, Rh, Pd, Os, Ir, Pt), while the final metal layer applied by electroless plating is preferably a layer comprising one or more metals from groups 10 and 11 (Ni, Cu, Pd, Ag, Pt, Au) and Rh, Ru, Cr, most preferably comprising at least 40% (w/w) of palladium (Pd) and/or silver (Ag), and/or nickel (Ni).

Pretreatment

In the process of the invention, the transition metal salt used in the pre-treatment solution is a soluble, especially water-soluble, preferably divalent, transition metal salt such as palladium chloride, palladium nitrate, palladium sulphate or palladium selenate, platinum chloride, platinum nitrate, rhodium(III) chloride, nickel chloride, nickel nitrate, nickel sulphate etc. These salts give more homogeneous results than e.g. acetate salts. The preferred salt, also in terms of a homogeneous coverage, is palladium (II) chloride of platinum (IV) chloride. The concentration of the transition metal salt solution can be e.g. 56-225 mM, preferably 113-188 mM. These values correspond to e.g. between 6 and 24 g, preferably between 12 and 20 g Pd per liter, or to between 11 and 43.9 g, preferably between 22 and 36.7 g Pt per liter or to between 3.3 and 13.2 g, preferably between 6.6 and 11.0 g Ni per liter, and similarly for other metals.

The preferred solvent is cheap and non-hazardous, with a high solubility for the transition metal salt. Preferred solvents include water, lower alcohols such as 2-propanol, and acetone; most preferable the solution of the transition metal salt is an aqueous solution, "aqueous" meaning that more than 50% (by weight) of the solvent consists of water. Most preferred solvent is water. The application of chloroform is not preferred. Also, other haloalkanes are not preferred. The treatment can be performed using any coating technique, such as dipping, spraying, brushing etc. An advantageous coating method is film-coating, which allows easy control of impregnation depth and loading.

The pre-treatment conditions are selected in such a manner that the transition metal salt solution penetrates sufficiently into the support, without excessive penetration. This can be achieved by using relatively short contact times, such as with film coating. It is preferred that the palladium penetrates to a depth between 1 and 10 μm, more preferably to no more than 5 μm. The amount and concentration of the solution and the contact time are preferably selected so that the amount of transition metal (palladium, platinum or other) into the pores ranges from 5 to 15 mg per 100 mm tube length, after reduction. Thus a preferred coating rate is between 5 and 100 mm/s, preferably between 15 and 75 mm/s, most preferably between 25 and 60 mm per second.

The pretreatment preferably results in an amount of transition metal in the pre-treated support between 10 and 30 mg, preferably between 12 and 24 mg per 10,000 $mm^2$ ($dm^2$). When the support is tubular, especially with an outer diameter between 12 and 18 mm, the amount of transition metal is preferably 5 to 12 mg per 100 mm tube length. The loading and penetration depth can be further adjusted by varying the transition metal concentration in the pre-treatment solution. The loading and penetration depth can be checked e.g. by using Scanning Electron Microscope (SEM) photometry.

The porous support can optionally be supported by a dense support, and may act as a rough anchorage layer. The support preferably has a sufficient wettability before the pretreatment. If necessary, the wettability can be improved by plasma (chemical) etching using appropriate etching agents such as hydrohalic acids.

The pre-treatment can be a single coating step, or repeated coating steps, with intermittent partial or complete drying. After the pre-treatment, the pre-treated support is dried at ambient or elevated temperatures, e.g. between 40 and 100° C.

Reduction

The next step is activation of the transition metal by reducing it to the zero-valent state. This is preferably achieved by treatment with hydrogen-containing gas or other reducing gas at elevated temperatures. The hydrogen-containing gas may e.g. be pure hydrogen, but also mixtures of hydrogen and inert other gases, such as argon or nitrogen, or another reducing gas. Advantageous conditions for the reduction step include a temperature of between 400 and 700° C., preferably between 475 and 625° C. The membranes carrying the reduced transition metal (palladium, platinum or other) seeds are subsequently cooled to ambient temperatures under an inert atmosphere, such as nitrogen.

Plating

Finally palladium and/or other metals are deposited on the transition metal-seeded supports, e.g. in an electroless process, following methods known per se for electroless, i.e. autocatalytic, plating using transition metal complexes, such as tetra-ammine palladium dichloride ($Pd(NH_3)_4Cl_2.2H_2O$), ammonium hexachloroplatinate, diammine silver salts, potassium pentachloro-ruthenate, and combinations thereof, and a stabilising agent such as EDTA and a reducing agent such as hydrazine. Methods of electroless plating are described e.g. by Collins and Way (*Ind. Eng. Chem. Res.* 1993) and other references cited above under 'Background'. As a result of the pre-treatment of the invention, the stability of the electroless plating bath is increased, e.g. in that there is only heterogeneous deposition and no homogeneous deposition. This means that there is only transition metal formed on the surface of the support and no crystalline material is formed in the bath itself. Such homogeneous depositing leads to a turbid solution giving way to depositing irregular agglomerates of material on the support and on the bottom of the bath and consequently depletion of transition metal precursor and decreasing plating rate. Details about electroless plating of transition metals, including nickel, silver, copper, gold, platinum, cobalt etc. can be found in "Electroless Plating, Fundamentals and Applications", Ed. O. Mallory & Hajdu, American Electroplateers and Surface Finishers Society, Inc. Noyes Publications, NY.

Instead of, or especially in addition to, palladium, other suitable metals can be used, such as silver, platinum, copper, gold, rhodium, ruthenium and chromium. Therefore, each time where reference is made to 'palladium' in the description above and below, this can be wholly, or preferably partly (alloys), exchanged by other metals, in particular nickel, copper, silver and/or gold. In a membrane according to the invention, the metal layer preferably comprises 5-95 wt. % of one or more metals selected from nickel, palladium, platinum, copper, silver, rhodium and gold.

Preferably the palladium content of the plated layer is at least 40 wt. %, more preferably at least 50 wt. %. Specifically advantageous are alloys of 50-95 wt. % of palladium and 5-50 wt. % of other metals. These other metals include one or more metals from the groups 8-11 (VIII and Ib), such as nickel, copper, ruthenium, rhodium, platinum, silver and gold, but also metals such as yttrium, cerium, indium, chromium, zirconium, etc., as well as phosphorus, in particular in combination with nickel. A palladium alloy containing 65-85 wt. % palladium and 15-35 wt. % silver is particularly useful. Also, an alloy of 70-99 wt. % palladium and 1-30 wt. % copper and/or gold is highly suitable for hydrogen separation.

Alternatively, the membrane layer can contain at least 40 wt. wt, more preferably at least 50 wt. % of silver and/or nickel, in particular silver. An alloy containing 65-85 wt. % silver and 5-35 wt. % zirconium, and optionally 0-25 wt. % of other metals, is particularly useful. Electroless plating of a palladium, platinum, silver or other alloy can be performed using a plating bath containing the relevant metal salts, e.g. palladium chloride or nitrate and silver nitrate in the required ratios.

When alloy layers are manufactured, it is advantageous to first carry out a first metal (e.g. palladium or silver) plating step and then the further metal or metals can be applied with a second bath. For such a multistep alloy manufacture, it is preferred that the second and optionally further plate bath contains some palladium, e.g. between 2 and 20 wt. %, to facilitate the plating process.

Applications

The transition metal-based membranes on a porous support which can be produced by the methods described above are especially suitable for hydrogen separation. The membranes are characterised by a transition metal layer at one side having a thickness of between 1 and 10 μm. Preferably, the transition metal layer has a thickness of between 2 and 5 μm, most preferably between 2 and 4 μm. Preferably, the transition metal layer contains 40-100 wt. % of palladium, more preferably 50-95 wt. % of palladium, and 0-60 wt. %, more preferably 5-50 wt. %, most preferably 10-40 wt. % of other metals as mentioned above, in particular nickel, platinum, copper, silver and/or gold.

As described above, a preferred embodiment of the membrane is a tubular membrane, more preferably a tubular membrane having the transition metal layer at the outside surface. In particular, the tubular membrane has an outer diameter between 5 and 50 mm, preferably between 10 and 25 mm. The hydrogen permeance is at least $5\cdot10^{-7}$ mol/m$^2$·s·Pa, in particular at least $10^{-6}$ mol/m$^2$·s·Pa or even at least $2\cdot10^{-6}$ mol/m$^2$·s·Pa. The $H_2/N_2$ selectivity, i.e. the relative permeation of hydrogen over nitrogen, is at least 200, in particular at least 1000, or even at least 5000.

The invention further relates to a process of separating hydrogen from a gas mixture, comprising subjecting the gas mixture to the membrane as described above. The membrane will selectively allow the passage of hydrogen and thus separate it from other gas molecules, including oxides, such as carbon monoxide, carbon dioxide, and nitrogen oxides, and hydrides such as ammonia, water, hydrocarbons (methane, ethane, ethene, and higher homologues. The membranes obtainable with the process of the invention have the advantage of providing higher selectivities (better separation) at lower thicknesses and consequently higher permeance, thanks to the defect-free thin films produced by the process.

Alternatively, the transition metal layer contains 40-100 wt. % of silver, more preferably 50-95 wt. % of silver, and 0-60 wt. %, more preferably 5-50 wt. %, most preferably 10-40 wt. % of other metals as mentioned above, in particular nickel, platinum, palladium, copper, gold and/or zirconium or other less noble metals.

Thus, in another embodiment, the invention relates to a process of separating oxygen from a gas mixture, comprising subjecting the gas mixture to the membrane as described above. The silver-containing membrane will selectively allow the passage of oxygen and thus separate it from other gas molecules. The membranes obtainable with the process of the invention have the advantage of providing higher selectivities (better separation) at lower thicknesses and consequently higher permeance, thanks to the defect-free thin films produced by the process.

In yet another embodiment, the invention relates to layers other than membranes, comprising transition metals, especially noble or pseudo noble metals, such as silver, gold, palladium, chromium etc. for antimicrobial, protective, decorative or other purposes. Very thin layers of gold, 100 nm, are e.g. known to enhance brazing and soldering of nickel materials. Further also jewelry can be treated in a similar way. Auto-catalytic deposited nickel phosphorous alloys are harder and provide a better protection than galvanic deposited nickel. Anchorage on the support is important for the long term behaviour of these layer. Silver films deposited with electroless plating techniques are known for a biocidal agent (Sabbani et al., Microporous and Mesoporous Materials, 135 (2010) 131-136). A rhodium finish is often used in jewelry for the bright white appearance of the metal. Preparation can be done through electroless plating with triamminetris(nitrito-N,N,N)rhodium(III) (U.S. Pat. No. 6,455,175).

EXAMPLES

Example 1

A 500 mm tubular asymmetrical macroporous $Al_2O_3$ support having two α-alumina layers, outer diameter 14 mm, pore size 0.2 μm, was film-coated with a solution containing 1.57 g $PdCl_2$, 1.025 ml HCl 37% and 63.150 ml of MQ water. The coating rate was 40 mm/sec. The film-coating process was repeated once. The coated tubes were dried at 70° C.

The dried Pd-seeded tubes were then activated by first slowly heating up to 500° C. under a gentle flow of nitrogen followed by a treatment with hydrogen at 500° C. The tubes are weighed to determine the palladium seed load. The Pd load is at least 7 mg per 100 mm support.

The palladium-seeded tubular membranes were subsequently plated by electroless plating at 55° C. with a plate bath solution containing 5.4 g/l $PdCl_2$, 70 g/l EDTA (Titriplex), 434 ml/l $NH_4OH$ (25 w/o), and 7.5 ml hydrazine (2.05 M) per liter plate bath solution for 2 hours.

The resulting membranes have a thickness of less than 4 μm, and a high $H_2/N_2$ selectivity: the membrane is leak-tight in that no nitrogen flow is measured at a pressure difference across the membrane of 2 bar, and the hydrogen flux (permeance) is $9.5*10^{-7}$ mol/m$^2$·s·Pa. The $H_2/N_2$ permselectivity, which is measured by separately measuring pure hydrogen and pure nitrogen permeation, is >1000 at 350° C.

Example 2

A 500 mm tubular asymmetrical macroporous $Al_2O_3$—$ZrO_2$ support having one alumina layer and one zirconia layer, outer diameter 14 mm, pore size 0.2 μm, was film-coated with palladium and subsequently activated as described in Example 1. The palladium seed load was at least 7 mg per 100 mm tube length.

The palladium-seeded tubular membranes were subsequently plated by electroless plating as described in Example 1. The resulting membranes have a thickness of less than 4 μm, and a high $H_2/N_2$ selectivity and are leak-tight. The $H_2/N_2$ perm-selectivity is >1000, and the hydrogen flux (permeance) is $1.5*10^{-6}$ mol/m$^2$·s·Pa at 350° C.

Example 3

A 500 mm tubular asymmetrical macroporous $Al_2O_3$—$ZrO_2$ support having one alumina layer and one zirconia layer, outer diameter 14 mm, pore size 0.2 μm, was film-coated with palladium and subsequently activated as described in Example 1. The palladium seed load was at least 7 mg per 100 mm tube length.

The palladium-seeded tubular membranes were subsequently plated by electroless plating at 55° C. with a plate bath solution containing 4.8 g/l $AgCl_2$, 33 g/l EDTA (Titriplex), 730 ml/l $NH_4OH$ (25 w/o), and 3.5 ml hydrazine (2.05 M) per liter plate bath solution for 6 hours.

The resulting membranes have a thickness of less than 5 μm, and a high $O_2/N_2$ selectivity: the membrane is leak-tight in that no nitrogen flow is measured at a pressure difference across the membrane of 2 bar, and the oxygen flux (permeance) is $>10^{-8}$ mol/m$^2$·s·Pa. The $O_2/N_2$ permselectivity, which is measured by separately measuring pure oxygen and pure nitrogen permeation, is >10 at 350° C.

Example 4

A 500 mm tubular asymmetrical macroporous $Al_2O_3$ support having two α-alumina layers, outer diameter 14 mm, pore size 0.2 μm, was film-coated with a solution containing 1.57 g $PtCl_4$ and 63.150 ml of MQ water. The coating rate was 40 mm/sec. The film-coating process was repeated once. The coated tubes were dried at 70° C.

The dried Pt-seeded tubes were then activated by first slowly heating to 500° C. under a gentle flow of nitrogen followed by a treatment with hydrogen at 500° C. The tubes are weighed to determine the platinum seed load. The Pt load is at least 7 mg per 100 mm support.

The platinum-seeded tubular membranes were subsequently plated by electroless plating as described in Example 1. The resulting membranes have a thickness of less than 4 μm, and a high $H_2/N_2$ selectivity and are leak-tight. The $H_2/N_2$ perm-selectivity is >1000, and the hydrogen flux (permeance) is $1*10^{-6}$ mol/m$^2$·s·Pa at 350° C.

The invention claimed is:

1. A process of producing layers of one or more transition metals on a porous support, comprising:

(a) pre-treating the porous support by film-coating with a solution of a transition metal chloride, nitrate, sulphate or selenate salt at a coating rate between 5 and 100 mm/s, (b) drying the pre-treated support at a temperature of between 40 and 100° C., (c) reducing the transition metal salt to the corresponding transition metal, and (d) electroless plating the pre-treated support with one or more transition metals.

2. The process according to claim 1, wherein the transition metal salt is a transition metal chloride or nitrate of a metal of the platinum group (Fe, Co, Ni, Ru, Rh, Pd, Os, Ir, Pt).

3. The process according to claim 2, wherein the transition metal salt is a nickel, palladium or platinum chloride.

4. The process according to claim 1, wherein the solution is an aqueous solution.

5. The process according to claim 4, wherein the reducing is performed at a temperature of between 475 and 625° C.

6. The process according to claim 1, wherein the reducing is performed with a hydrogen-containing gas at a temperature of between 400 and 700° C.

7. The process according to claim 1, wherein the support is tubular and the amount of transition metal in the pre-treated support ranges from 5 to 12 mg per 100 mm tube length.

8. The process according to claim 1, wherein the support is tubular and the coating rate is between 15 and 75 mm tube length per sec.

9. The process according to claim 1, wherein the transition metal penetrates into the support for no more than 5 μm.

10. The process according to claim 1, wherein the solution comprises between 113-188 mM of the transition metal.

11. The process according to claim 1, wherein the one or more transition metals used for plating are selected from palladium, nickel and silver.

12. The process according to claim 11, wherein the one or more transition metals comprise at least 40 wt. % of palladium.

13. A tubular membrane based on a transition metal on a porous tubular support, said membrane being characterised by a first transition metal layer comprising at least 65 wt. % of silver, said layer having a thickness of between 1 and 5 μm at one side of the support, with seeds of a second transition metal selected from the group consisting of Fe, Co, Ni, Ru, Rh, Pd, Os, Ir, Pt, said seeds being present in an amount of 10-30 mg per dm$^2$ of support and having a depth of between 0.5 and 5 μm into the support, and by having an oxygen to nitrogen selectivity of at least 10.

14. A process of separating oxygen from a gas mixture, comprising subjecting the gas mixture to a tubular membrane according to claim 13.

* * * * *